United States Patent [19]

Spears et al.

[11] Patent Number: 4,987,481
[45] Date of Patent: Jan. 22, 1991

[54] VIDEO NOISE REDUCTION SYSTEM

[75] Inventors: Steven Spears, West Covina; David Walker, Glendora, both of Calif.

[73] Assignee: Walker Digital Audio Video Systems, Inc., Covina, Calif.

[21] Appl. No.: 345,115

[22] Filed: Apr. 28, 1989

[51] Int. Cl.$^5$ .................. H04N 5/213; H04N 9/64
[52] U.S. Cl. ............................ 358/36; 358/167
[58] Field of Search ........................... 358/36, 167

[56] References Cited

U.S. PATENT DOCUMENTS

| | | | |
|---|---|---|---|
| 3,875,584 | 4/1975 | Fletcher et al. | 358/36 |
| 4,107,736 | 8/1978 | Lowry et al. | 358/36 |
| 4,163,249 | 7/1979 | Michael et al. | 358/167 |
| 4,220,965 | 9/1980 | Heitmann et al. | 358/22 |
| 4,539,594 | 9/1985 | Illetschko | 358/167 |
| 4,573,070 | 2/1986 | Cooper | 358/36 |
| 4,635,120 | 1/1987 | Ichinoi | 358/167 |

FOREIGN PATENT DOCUMENTS

3617827 12/1987 Fed. Rep. of Germany ........ 358/36

*Primary Examiner*—John W. Shepperd
*Attorney, Agent, or Firm*—Blakely, Sokoloff, Taylor & Zafman

[57] ABSTRACT

Circuitry for selectively reducing noise which results from film granularity, circuitry imperfections and other sources of random signal degradation by averaging, non-recursively, between 2 and 9 frames of digitized video information. By such averaging, since the noise is random, it is filtered out leaving only the desired picture. The averaging is performed only on areas of the picture which are close in both amplitude and color in adjacent frames. In this connection, in cases where there is no motion or scene change between adjacent frames, the entire picture corresponding to such frames can be processed according to the present invention.

16 Claims, 3 Drawing Sheets

FIG. 2

VIDEO NOISE REDUCTION SYSTEM

SUMMARY OF THE INVENTION

The present invention has application in the field of film to video tape conversation, but works in conjunction with any video signal from which it is desired to reduce noise which results from film granularity, circuitry imperfections and other sources which cause random signal degradation. The present invention assumes that such noise is random from frame to frame, and within a particular area of a frame in which noise is to be reduced, the corresponding area in adjacent frames is similar.

The present invention operates by selectively and non-recursively averaging between 2 and 9 frames of video. That is, once an average is established for a set of video frames, that result is not fed back and used to calculate an average for a subsequent set of video frames. By such averaging, since the noise is random, it is filtered out leaving only the desired picture. The averaging is performed only on areas of the picture which are close in both amplitude and/or color in adjacent frames. In this connection, in cases where there is no motion or scene change between adjacent frames, the entire picture corresponding to such frames can be processed according to the present invention.

In the prior art, it is known that noise in a video signal can be reduced by recursively combining, on a frame by frame basis, portions of an image which are stationery from frame to frame. In a particular technique disclosed by Lowry et al., in U.S. Pat. No. 4,107,736, in a color system, conventional luminance and chroma separation methods, which are used for the moving portions of the picture, are replaced in the stationery portions by an opposite phase frame comparison method. This patent is directed to a technique for determining which portions of pairs of adjacent frames are stationery and which portions are moving and then averaging those portions of the pairs of adjacent frames which are stationary.

DETAILED DESCRIPTION OF THE INVENTION

Figures 1, 4:
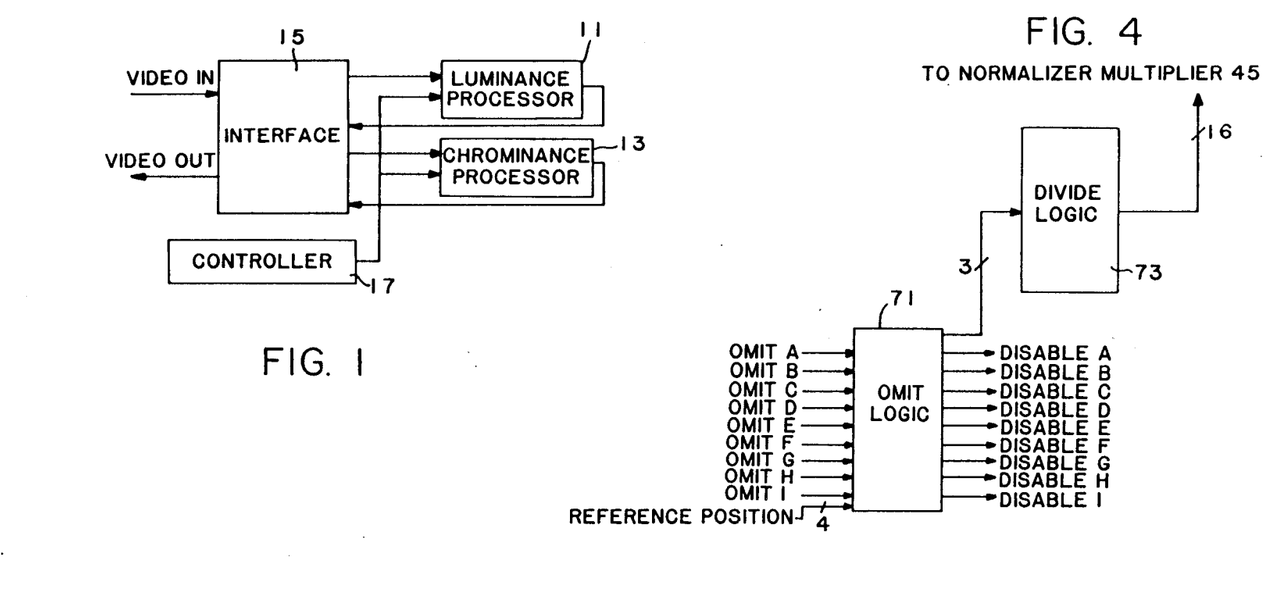
FIG. 1 is a block overview diagram showing the various signals input to and output from the invented circuit.
FIG. 4 is a block diagram of frame omit logic 43.

Referring to FIG. 1, the present invention comprises a luminance processor 11 and a chrominance processor 13, both of which are coupled to an interface 15 and a controller 17. Interface 15 is a video interface which converts a video input signal (Video In) containing video information into a 8 to 12 bit signal containing luminance information which is input to luminance processor 11, or chrominance information which is input to chrominance processor 13. Interface 15 receives 8 to 12 bit output signals from luminance processor 11 and chrominance processor 13 and combines such signals into a video output signal (Video Out). The specifics of interface 15 depend upon the format of the Video In and Video Out signals which may be, for example, NTSC, PAL, RGB, SECAM, etc. For example, a suitable device for providing an 8 bit component video signal usable by the present invention is a Telecine made by Rank Cintel, Model MK IIIC.

In operation, the present invention also requires a source of control signals, the particulars of which will be described below with reference to FIGS. 2-4, which control signals are shown in FIG. 1 as emanating from controller 17. The particulars of controller 17 will be apparent to those skilled in the art based upon a description of the required control inputs which will be discussed below with reference to FIGS. 2-4. Also required are circuitry for generating clock signals and a source of control signals for accessing the various digital circuitry utilized. However, the specific details for generating such signals are not needed to obtain an understanding of the invention, and since such details are well within the abilities of a person skilled in the relevant art, will not be set forth herein to avoid unnecessarily obfuscating the invention. Additionally, the invention is described with reference to specific bit lengths and the like. However, such details are specified to illustrate the invention and are not intended to limit the scope of the invention. Further, although this description assumes that positive logic is used, the invention may be practiced using negative logic as well.

Figure 2:
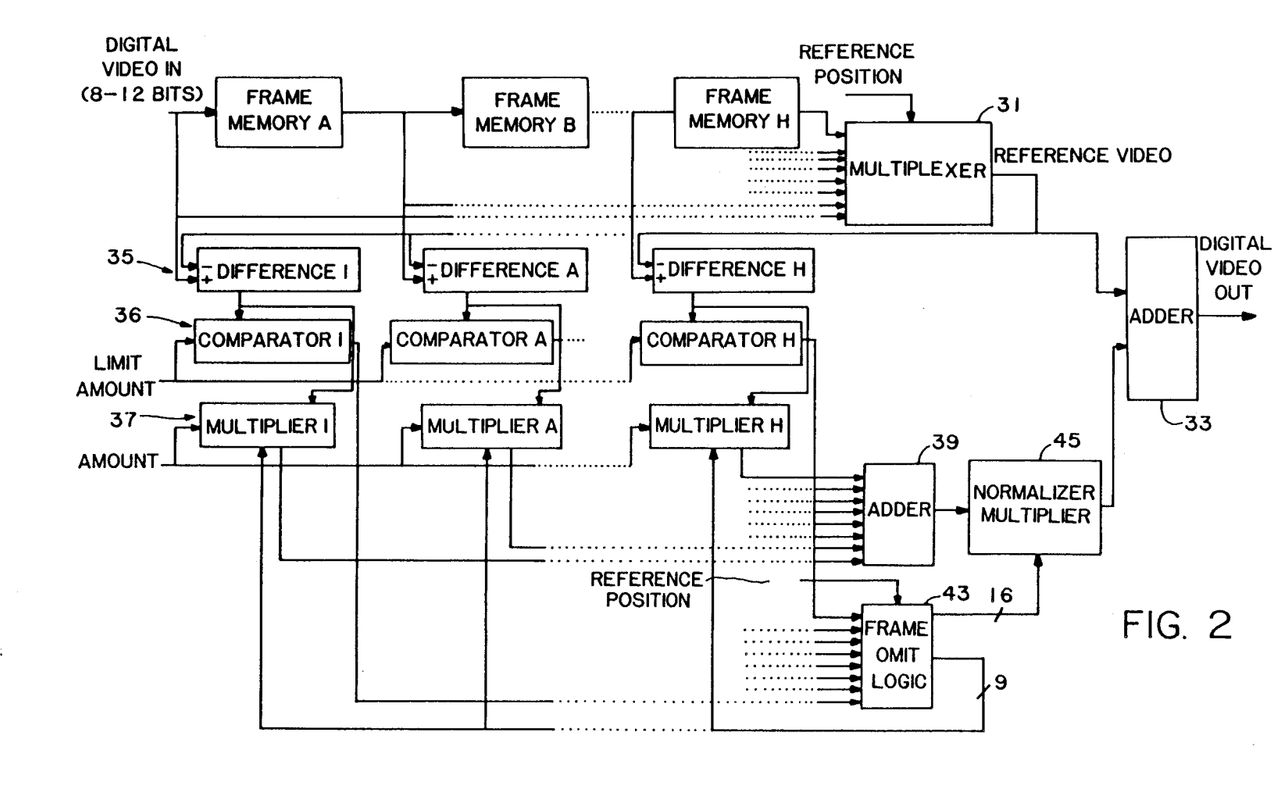
FIG. 2 is a block diagram representing the luminance processor or chrominance processor of the invention.

Referring now to FIG. 2, a block diagram of luminance processor 11 is shown. A block diagram for chrominance processor 13 would be identical to the circuitry for luminance processor 11. Thus, although the following description will describe luminance processor 11, it should be understood that the description applies equally as well to the circuitry of chrominance processor 13. Additionally, in alternate embodiments, there may be only a single processor of the type above in FIG. 2 for processing black and white pictures which do not have any chrominance, or there may be three processors of the type above in FIG. 2 when the video signal is RBG, there being one processor for each of the colors red, blue and green.

As shown in FIG. 2, luminance processor 11 comprises a set of frame memories A–H, or a total of 8 frame memories. The following description will assume that 8 frame memories are available. However, good results can be obtained when as few as 3–4 frame memories are used. Frame memories B–G are not shown, but their circuitry and related interconnections are identical to those for frame memories A, B and H which are shown in FIG. 2. Each frame memory stores a single frame of video information, which, when digitized, may be represented in a 12 bit by 512 K bit RAM. The frame memories are arranged in a pipeline such that during successive clock cycles of a clock (not shown), the information from Digital Video In from interface 15 is moved to frame memory A, then to frame memory B, then to frame memory C and so on. Thus, after 8 cycles, frame memories A–H contain 8 consecutive frames of video information, all of which are input along with the current Digital video In signal into multiplexor 31 which selects one of the nine inputs depending upon the signal Reference Position which is a four bit signal generated by controller 17 as a function of the position of a 9 position switch. The 9 position switch is normally set to the middle position so as to select frame memory D as its output when all eight frame memories are in use. However, whichever frame memory is selected by multiplexor 31 will be referred to herein as the reference video signal.

The reference video signal is one input to an adder 33. The reference video signal is also input into difference circuits 35, shown in FIG. 2 as difference circuits A-I (only I, A and H are shown), each forming a difference signal which is a subtraction between the reference video signal and the other video signal input to the corresponding difference circuit. The other video signal input to the difference circuits is Digital Video In or an output from one of frame memory A to frame memory H. These video signals will be referred to herein as I and A-H, respectively.

The difference signal is then input to a corresponding one of comparators 36 and multipliers 37. There is one comparator (A-I) and one multiplier (A-I) corresponding to each difference circuit A-I. The comparators A-I generate a set of corresponding omit signals (Omit A-I) and multipliers A-I generate a set of corresponding difference signals (Difference A-I). The particulars of comparators A-I, multipliers A-I as well as difference circuits A-I and the generation of the difference and omit signals will be described with reference to FIG. 3. However, the generated difference signals are input into adder circuitry 39 which sums the upto 9 difference signals generated by multipliers A-I.

The omit signals generated by comparators A-I are input to frame omit logic 43, the specifics of which will be described below with reference to FIG. 4, which generates a set of 9 corresponding disable signals A-I which are input into corresponding multipliers A-I. Frame omit logic 43 also generates a signal which is input to normalizer multiplier 45 along with the output generated by adder circuitry 39. The signal input to normalizer multiplier 45 from frame omit logic 43 is a 16 bit fraction used by normalizer multiplier 45 to normalize the difference signal generated by adder 39 as a function of the number of frames averaged from sample to sample, the details of which will be described below with reference to FIG. 4. The normalized difference signal is added to the reference video signal by adder 33 which produces a digital video output signal to interface 15. Adder 33 may be implemented using a 16-bit ALU such as part no. L4C381 available from Logic Devices. Normalizer multiplier 45 may be implemented by a 16 by 16 multiplier such as part no. LMU216 available from Logic Devices.

An implementation of difference circuits 35, comparators 36 and multipliers 37 will now be described with reference to FIGS. 3a and 3b which illustrate a single difference, comparator and multiplier, where X represents one of A-I. That is, FIGS. 3a and 3b illustrate the circuitry needed to generate a single omit signal and a single difference signal for input to frame omit logic 43 and adder 39 respectively. This circuitry is replicated such that there are nine such circuits for each of the signals A-I.

Figure 3A:
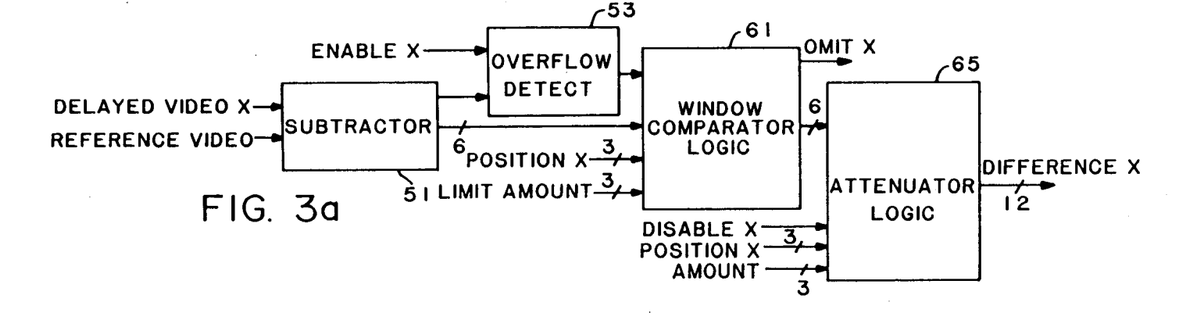
FIG. 3a is a block diagram of a single difference, comparator and multiplier used by the invention.
Figure 3B:
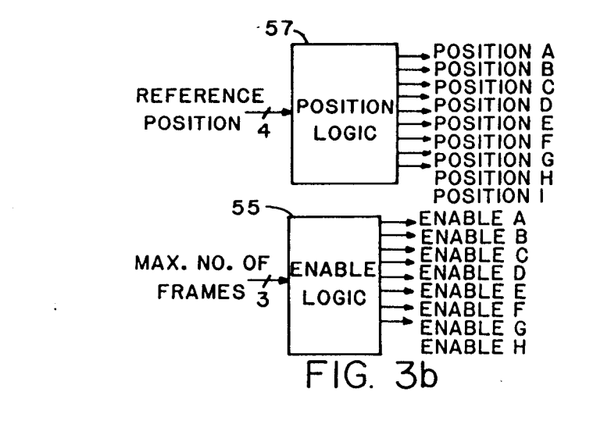
FIG. 3b is a block diagram showing two circuits which generate signals used by a single difference, comparator and multiplier of the invention.
Figure 3C:
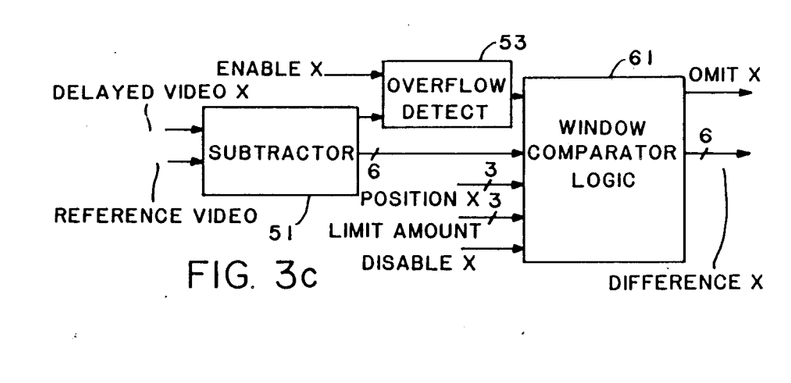
FIG. 3c is a block diagram of an alternate embodiment of the circuits similar to FIG. 3a but excluding the multiplier.

Referring now to FIGS. 3a and 3b, a particular implementation of a single difference circuit 35, comparator 36 and multiplier 37 will be described. A difference circuit 35 comprises a subtractor 51 such as a L4C381 16-bit ALU available from Logic Devices whose inputs are the reference video signal and one of Digital Video In (I) or the output from one of frame memories A-H.

The high order 7 bits of the output is a signed number which is input to overflow detect circuit 53 which is a 8 bit magnitude comparator, such as a 74F521 available from Signetics, the other input being an enable signal Enable X (meaning one of Enable A-I) from Enable PROM 55 shown in FIG. 3b. Overflow detect circuit 53 is a logic circuit which outputs a logic 1 when the high order bits (i.e., over 6 bits) are not all 0's (positive number) or all 1's (negative number) and Enable X is 1. That is, overflow detect circuit 53 outputs a logic 0 when the difference between the reference video and the signal X (i.e., A-H) requires six bits or less and X is within the maximum number of frames being processed as determined by Enable PROM 55 based upon the signal Max. No. of Frames, otherwise overflow detect circuit 53 outputs a logic 1. The signal Max. No. of Frames is a 3 bit signal generated by controller 17 as a function of a user switch which may be set to 1 to 8 representing the maximum number of frames to be summed by adder, i.e., from 1 to 8. PROM 55 generates the signals Enable A-Enable H according to the following table:

TABLE I

| Max No. of Frames | Enable | | | | | | | |
|---|---|---|---|---|---|---|---|---|
| | A | B | C | D | E | F | G | H |
| 1 | 1 | 0 | 0 | 0 | 0 | 0 | 0 | 0 |
| 2 | 1 | 1 | 0 | 0 | 0 | 0 | 0 | 0 |
| 3 | 1 | 1 | 1 | 0 | 0 | 0 | 0 | 0 |
| 4 | 1 | 1 | 1 | 1 | 0 | 0 | 0 | 0 |
| 5 | 1 | 1 | 1 | 1 | 1 | 0 | 0 | 0 |
| 6 | 1 | 1 | 1 | 1 | 1 | 1 | 0 | 0 |
| 7 | 1 | 1 | 1 | 1 | 1 | 1 | 1 | 0 |
| 8 | 1 | 1 | 1 | 1 | 1 | 1 | 1 | 1 |

A single comparator 36 comprises a PROM 61 whose inputs are the logic signal generated by overflow detect circuit 53, the low order six bits output by subtractor 51, Position X (where X is one of A-I) generated by Position PROM 57 and a signal Limit Amount generated by controller 17. Position PROM 57 generates the logic signals Position A-Position I based upon the 4-bit signal Reference Position which is a 4-bit signal generated by controller 17 The signal Reference Position is set by a 9 position user controlled switch which may be set to 0 to 8 and represents the desired reference frame according to the following table:

TABLE II

| Reference Position | 0 | 1 | 2 | 3 | 4 | 5 | 6 | 7 | 8 |
|---|---|---|---|---|---|---|---|---|---|
| Reference Frame | I | A | B | C | D | E | F | G | H |

Position PROM 57 encodes the 4-bit Reference Position signal to a 3-bit signal Position X (i.e., A-I) ranging from 0 to 7 by utilizing the fact that the 6-bit difference signal will always be 0 for the reference frame. Position X indicates the current reference position and allows a position dependent Limit Amount (described below) to be set. It is desirable to have a smaller Limit Amount for frames ahead of the reference frame in time. The following table illustrates the necessary encoding performed by PROM 57:

TABLE III

| Reference Position | Position | | | | | | | | |
|---|---|---|---|---|---|---|---|---|---|
| | A | B | C | D | E | F | G | H | I |
| 0 | 0 | 7 | 6 | 5 | 4 | 3 | 2 | 1 | 0 |
| 1 | 0 | 0 | 7 | 6 | 5 | 4 | 3 | 2 | 0 |
| 2 | 1 | 0 | 0 | 7 | 6 | 5 | 4 | 3 | 1 |
| 3 | 2 | 1 | 0 | 0 | 7 | 6 | 5 | 4 | 2 |
| 4 | 3 | 2 | 1 | 0 | 0 | 7 | 6 | 5 | 3 |

TABLE III-continued

| Reference Position | Position | | | | | | | | |
|---|---|---|---|---|---|---|---|---|---|
| | A | B | C | D | E | F | G | H | I |
| 5 | 4 | 3 | 2 | 1 | 0 | 0 | 7 | 6 | 4 |
| 6 | 5 | 4 | 3 | 2 | 1 | 0 | 0 | 7 | 5 |
| 7 | 6 | 5 | 4 | 3 | 2 | 1 | 0 | 0 | 6 |
| 8 | 7 | 6 | 5 | 4 | 3 | 2 | 1 | 0 | 7 |

The signal Limit Amount is a 3 bit quantity that indicates the size of a noise window. The Limit Amount ranges from 0 to 7 based upon the setting of an 8-position switch set by the user who selects the setting to suit the source material. The 3 bit quantity is encoded by windows comparator logic 61 to specify a bounds on the magnitude of the 6-bit difference signal such that if the bounds is exceeded, Omit X (i.e., one of A-I) is set. For example, the bounds may be set according to the following table:

TABLE IV

| Limit Amount | Magnitude of Bounds |
|---|---|
| 0 | 1 |
| 1 | 2 |
| 2 | 3 |
| 3 | 4 |
| 4 | 5 |
| 5 | 6 |
| 6 | 7 |
| 7 | 31 |

The output of window comparator logic 61 is the 6 bit difference signal and the omit signal, Omit X. The omit signal is set if the difference is outside the noise window determined by Limit Amount or if the output from overflow detect circuit 53 is set.

The Omit X signal is used by frame omit logic 43 in a manner to be described below.

A single multiplier 37 comprises attenuator logic 65 whose inputs are the 6-bit difference signal from window comparator logic 61, Position X (where X is one of A-I) generated by position logic 57, Disable X (where X is one of A-I) generated by frame omit logic 43 and a signal Amount from controller 17. The 6-bit difference signal and Position X have been described above. Disable X is a logic signal which causes attenuator logic 65 to output 0's when set. If Disable X is reset, attenuator logic 65 outputs the 6-bit difference signal as a 12 bit number including six fractional bits determined by the signal Amount.

The signal Amount is a signal generated by controller 17 and is a 3 bit quantity that selects the amount of noise to be left in the picture. The amount comes from an 8 position switch ranging from 0 to 7. The greater the number, the less the attenuation, and the greater the amount of noise that is removed. A setting of 7 sends the 6-bit difference signal straight through to adder 39 with the six fractional bits set to 0. A setting of 0 to 6 multiplies the 6 bit difference signal by the fractions ⅛, 2/8, ⅜, 4/8, ⅝, 6/8 and ⅞ respectively. The user can adjust the setting of the 8 position switch to suit the source material. In an alternate embodiment, multiplier 37 may be omitted in which case the output from window comparator logic 61 may be input directly to adder 39. In this case, the signal Disable X from frame omit logic 43 is input directly to window comparator logic 61 as shown in FIG. 3c.

The only difference between the nine difference, comparator and multiplier circuits A-I is that there is no Enable I input and window comparator logic 61 may encode Limit Amount differently than that specified in Table Iv based on whether that window comparator logic is to the left or right of the Reference Position and its distance from the Reference Position.

Referring now to FIG. 4, frame omit logic 43 comprises omit logic 71 and divide logic 73. Omit logic 71 inputs the individual omit signals Omit A-Omit I generated by window comparator logic 61 and the Reference Position generated by controller 17 and generates the disable signals Disable A-Disable I as follows. If an Omit X is set, a corresponding Disable signal is generated as well as for all positions further away from the Reference Position and on the same side. For example, assume that Reference Position is 4 meaning that the reference frame is the output from frame memory D. If Omit E is set, then Disable E is set as well as all Disables further away from the reference frame and on the same side, i.e., Disable F, Disable G, and Disable H are set. Similarly, if Omit C is set, then Disable C is set as well as all Disables further away from the reference frame and on the same side, i.e., Disable I, Disable A, and Disable B are set. This is necessary to ensure that changes between frames due to motion are processed properly.

Omit logic 71 also generates a 3-bit signal which feeds divide look-up logic 73. This signal has a range of 1 to 8 and is the number to divide by to normalize the sum of the difference signals. It takes on a value corresponding to the number of Omit A-I signals which are not disabled, i.e., the number of inputs to adder 41 which represent actual difference signals generated by multipliers 37, and excluding those difference signals which are 0 due to a corresponding Disable being set.

Although not shown in the Figures, omit logic 71 also generates a 4 bit signal that indicates the number of frames from 0 to 9 being averaged which is fed to a set of LED's.

Divide logic 73 receives the three bit signal generated by omit logic 71 and generates a 16 bit fraction: 1, ⅞, 6/8, ⅝, 4/8, ⅜, 2/8 or ⅛ which is input to normalizer multiplier 45. Since the number of frames averaged can change from sample to sample due to the signals Omit I-Omit H, this fraction changes to normalize the difference signal generated by multiplier 45.

As noted above, the present invention requires that multiple video frames be stored in memory. The best results are obtained when there are frames stored before and after the reference position because, during scene changes, there are always frames on at least one side of the scene change which have information to process. For example: If 8 frames are used and the reference position input to multiplexor 31 is set at 4, there would be 4 frames before and 4 frames after the current (reference) frame being processed.

Thus, at any point in time, there are 9 frames being processed. Frames which may be designated as I, A, B, and C are before the reference frame in time and frames which may be designated as E, F, G, and H are after the reference frame in time, where frame I is the Digital video In signal, A is the signal from frame memory A, B is the signal from frame memory B, etc.

The reference frame is individually subtracted from the other 8 frames on a sample by sample basis, each sample, for example, corresponding to a portion of a scan line. For each sample, the 8 difference signals generated by difference circuits A-I (the excluded difference circuit corresponding to the reference frame position) are used to determine which frames are to be used to generate the final averaged picture. Each difference signal is fed into a corresponding window comparator A-I. If the difference is out of range of the Limit Amount, Omit X is set and that frame is omitted.

All of the other difference signals (those that were not omitted) are added together by adder 39, then scaled by the number of frames used by normalizer multiplier 45 using the fraction generated by divide logic 73. For example if 3 frames were used, the resulting sum would be divided by 3. This result is added to the reference frame by adder 33 to generate the corrected picture.

Each difference signal is capable of being attenuated by a multiplier 37 before being summed together. This allows some noise to be left in if desired. It also allows different weighting of the difference signal based on distance from reference frame.

The number of frames averaged can be (and usually is) different in different areas of the picture, and also changes with motion.

The operation of the invented circuitry can be explained mathematically as follows (assuming Max. No. of Frames is 6 and Reference Position is 3):

| Let | I | = Digital Video in |
|---|---|---|
| | A | = output of frame memory A |
| | B | = output of frame memory B |
| | C | = reference frame, current output frame data |
| | D | = output of frame memory D |
| | E | = output of frame memory E |
| | F | = oldest frame data (F) |
| | M0–M6 | = attenuator 37 coefficients |
| | N | = Normalizing number, instantaneous number of frames averaged (1–7) |
| | R | = Averaged result for 1 to 7 frames (adder 33 output) |

$R = IM0/N + AM1/N + BM2/N + CM3/N + DM4/N + EM5/N + FM6/N$ (Eq. 1)

By definition (Since it is desirable that the resulting noise reduced signal have substantially the same amplitude as the input video):

$M0/N + M1/N + M2/N + M3/N + M4/N + M5/N + M6/N = 1$ and $M0 - M6$ are all $<= 1$ and positive.

Develop an equation equaling 0 using the current (C) output frame data:

$[C(1 - M3/N) - C(1 - M3/N)] = 0$ (Eq. A)

Substituting:

$M0/N + M1/N + M2/N + M3/N + M4/N + M5/N + M6/N = 1$ (Eq. B)

$[C - CM3/N - C(M0/N + M1/N + M2/N + M3/N + M4/N + M5/N + M6/N - M3/N)] = 0$

Since the M3/N term cancels out, adding Eq. B to Eq 1 yields:

$R = IM0/N + AM1/N + BM2/N + CM3/N + DM4/N + EM5/N + FM6/N + C - C(M0/N + M1/N + M2/N - CM3/N + M4/N + M5/N + M6/N)$ $R = C + [M0(I - C) + M1(A - C) + M2(B - C) + M4(D - C) + M5(E - C) + M6(F - C)]/N$

Also, $R = C - [M0(C - I) + M1(C - A) + M2(C - B) + M4(C - D) + M5(C - E) + M6(C - F)]/N$

We claim:

1. A circuit for reducing random noise in a video signal generated by a source external to said circuit by non-recursively averaging video information contained in a current video frame and a plurality of adjacent video frames delayed in time from said current video frame, said circuit comprising processor means for non-recursively averaging video information contained in said video signal for said current video frame and predetermined ones of said plurality of adjacent video frames and within predetermined portions of each of said video frames, wherein a predetermined one of said adjacent video frames is a reference frame;

wherein said processor means comprises:
(a) means for delaying the current video frame by at least one frame;
(b) means for deriving at least one signal representing a difference between each of said plurality of adjacent video frames and said reference frame;
(c) a window comparitor means corresponding to each of said plurality of adjacent video frames for generating a signal when said difference signal is outside a predetermined noise window;
(d) means for selectively averaging the at least one difference signal which is within said predetermined noise window;
(e) means for combining said averaged difference signal with said reference frame to thereby produce a video frame wherein random noise has been reduced.

2. A system for reducing random noise for a video signal by non-recursively averaging corresponding points on two adjacent frames of said video signal, said system comprising:
(a) means for delaying said video signal to provide said two adjacent frames of video information substantially simultaneously, wherein a predetermined one of said two adjacent video frames is a reference frame;
(b) difference means for deriving a difference signal representing a difference between said two adjacent video frames;
(c) window comparitor means coupled to said difference means for generating an omit signal which is active when said difference signal is outside a predetermined limit window and which is inactive when said difference signal is within said predetermined limit window;
(d) attenuator means coupled to said difference means for disabling said difference signal responsive to said omit signal;
(e) adder means having as one input a signal representing said reference frame and having as a second input the output of said attenuator means, said adder means for adding the output of said attenuator means to the signal representing said reference frame;

whereby a noise reduced video signal is produced.

3. A system for reducing random noise for a video signal by non-recursively averaging corresponding points on two adjacent frames of said video signal, said system comprising:
(a) means for delaying said video signal to provide said two adjacent frames of video information substantially simultaneously, wherein a predetermined one of said two adjacent video frames is a reference frame;
(b) difference means for deriving a difference signal representing a difference between said two adjacent video frames;
(c) window comparitor means coupled to said difference means for generating an omit signal which is active when said difference signal is outside a predetermined limit window and which is inactive when said difference signal is within said predetermined limit window;
(d) disable logic means coupled to said comparitor means for generating a disable signal responsive to said omit signal, wherein said disable signal is active when said omit signal is active;

(e) attenuator means coupled to said difference means for disabling said difference signal responsive to said disable signal;

(f) adder means having as one input a signal representing said reference frame and having as a second input the output of said attenuator means, said adder means for adding the output of said attenuator means to the signal representing said reference frame;

whereby a noise reduced video signal is produced.

4. The system defined in claim 3 wherein said disable logic means responds independently to said omit signals from an input video signal containing a luminance portion and said omit signals from an input video chrominance signal.

5. The system defined in claim 3 wherein said disable logic means responds to said omit signals from an input video signal containing a luminance portion and said omit signals from an input video chrominance signal.

6. The system defined in claim 3 wherein said attenuator means is contained within the window comparitor means wherein generation of said corresponding omit signal is independent of said corresponding disable signal.

7. A system for reducing random noise for a video signal by non-recursively averaging corresponding points on at least three adjacent frames of said video signal, said system comprising:

(a) means for delaying said video signal to provide said at least three adjacent frames of video information substantially simultaneously, wherein a predetermined one of said at least three adjacent video frames is a reference frame;

(b) difference means corresponding to at least two of said at least three adjacent video frames, each of said difference means for deriving a difference signal representing a difference between corresponding ones of said at least two of said at least three adjacent video frames and said reference frame;

(c) window comparitor means corresponding to each of said difference means, each of said window comparitor means for generating an omit signal which is active when said corresponding difference signal is outside a predetermined limit window and which is inactive when said corresponding difference signal is within said predetermined limit window;

(d) disable logic means coupled to each of said comparitor means for generating a disable signal corresponding to each of said omit signals, wherein each said disable signal is active when said corresponding omit signal is active;

(e) attenuator means corresponding to each of said difference means, each of said attenuator means for disabling said corresponding difference signal responsive to said corresponding disable signal;

(f) first adder means coupled to each of said attenuator means for adding the signals generated by each of said attenuator means;

(g) normalizer means coupled to the output of said first adder means for normalizing the output of said first adder means as a function of the number of said disable signals which are not active;

(h) second adder means coupled to the output of said normalizer means and having as an input a signal representing said reference frame, said second adder means for adding the output of said normalizer means to said reference frame;

whereby a noise reduced video signal is produced.

8. The system defined in claim 7 wherein said disable logic means generates said disable signals so that when at least one of said omit signals is active, the corresponding disable signal is activated along with each disable signal corresponding to said difference signals further away from and on the same side of said reference frame.

9. The system defined in claim 8 wherein said disable logic means responds independently to said omit signals from an input video signal containing a luminance portion and said omit signals from an input video chrominance signal.

10. The system defined in claim 8 wherein said disable logic means responds to said omit signals from an input video signal containing a luminance portion and said omit signals from an input video chrominance signal.

11. The system defined in claim 8 wherein said attenuator means is contained within the window comparitor means wherein generation of said corresponding omit signal is independent of said corresponding disable signal.

12. A system for reducing random noise for a video signal by non-recursively averaging corresponding points on at least three adjacent frames of said video signal, said system comprising:

(a) means for delaying said video signal to provide said at least three adjacent frames of video information substantially simultaneously, wherein a predetermined one of said at least three adjacent video frames is a reference frame;

(b) difference means corresponding to said at least three adjacent video frames, each of said difference means for deriving a difference signal representing a difference between corresponding ones of said at least three adjacent video frames and said reference frame;

(c) window comparitor means corresponding to each of said difference means, each of said window comparitor means for generating an omit signal which is active when said corresponding difference signal is outside a predetermined limit window and which is inactive when said corresponding difference signal is within said predetermined limit window;

(d) disable logic means coupled to each of said comparitor means for generating a disable signal corresponding to each of said omit signals, wherein each said disable signal is active when said corresponding omit signal is active;

(e) attenuator means corresponding to each of said difference means, each of said attenuator means for disabling said corresponding difference signal responsive to said corresponding disable signal;

(f) first adder means coupled to each of said attenuator means for adding the signals generated by each of said attenuator means;

(g) normalizer means coupled to the output of said first adder means for normalizing the output of said first adder means as a function of the number of said disable signals which are not active;

(h) second adder means coupled to the output of said normalizer means and having as an input a signal representing said reference frame, said second adder means for adding the output of said normalizer means to said reference frame;

whereby a noise reduced video signal is produced.

13. The system defined in claim 12 wherein said disable logic means generates said disable signals so that when at least one of said omit signals is active, the corresponding disable signal is activated along with each disable signal corresponding to said difference signals further away from and on the same side of said reference frame.

14. The system defined in claim 13 wherein said disable logic means responds independently to said omit signals from an input video signal containing a luminance portion and said omit signals from an input video chrominance signal.

15. The system defined in claim 13 wherein said disable logic means responds to said omit signals from an input video signal containing a luminance portion and said omit signals from an input video chrominance signal.

16. The system defined in claim 13 wherein said attenuator means is contained within the window comparitor means wherein generation of said corresponding omit signal is independent of said corresponding disable signal.

* * * * *

UNITED STATES PATENT AND TRADEMARK OFFICE
CERTIFICATE OF CORRECTION

PATENT NO. : 4,987,481
DATED : JANUARY 22, 1991
INVENTOR(S) : Steven Spears, et al It is certified that error appears in the above-identified patent and that said Letters Patent is hereby corrected as shown below:

On the title page: Item [75] Inventors:, delete "West Covina" should read --San Dimas --.

| | | |
|---|---|---|
| col. 01, line 30 | delete "stationery" | insert --stationary-- |
| col. 01, line 35 | delete "stationery" | insert --stationary-- |
| col. 01, line 38 | delete "stationery" | insert --stationary-- |
| col. 06, line 02 | delete "Table Iv" | insert --Table IV-- |
| col. 06, line 60 | delete "video" | insert --Video-- |
| col. 06, lines 39-40 | delete "1, 7/8, 6/8, 5/8, 4/8, 3/8, 2/8, or 1/8" | |
| | insert --1, 1/2, 1/3, 1/4, 1/5, 1/6, 1/7 or 1/8-- | |

Signed and Sealed this

Seventh Day of December, 1993

*Attest:*

BRUCE LEHMAN

*Attesting Officer*    *Commissioner of Patents and Trademarks*